UNITED STATES PATENT OFFICE 2,591,518

N,N - DI(β - CARBOALKOXYALKYL) ALKYL-BENZENE SULFONAMIDES AND THEIR USE AS POLYVINYL CHLORIDE PLASTICIZERS

Joachim Dazzi, Dayton, Ohio, assignor to Monsanto Chemical Company, St. Louis, Mo., a corporation of Delaware No Drawing. Application March 24, 1949, Serial No. 83,287

6 Claims. (Cl. 260—30.8)

This invention relates to new compositions of matter which are particularly useful as plasticizers in vinyl chloride resins. More particularly the invention relates to a new class of benzene sulfonamides which have alkylcarboxyethyl substituents attached to the nitrogen atom.

The primary purpose of this invention is to provide a new class of compounds which are prepared from readily available raw materials. A further purpose of this invention is to provide a means of preparing valuable plasticized vinyl chloride polymers having desirable properties over wide ranges of temperatures. A still further purpose of the invention is to provide low cost plasticizers with unusually low volatility.

It has been found that the benzene and toluene sulfonamide derivatives prepared by condensation with acrylonitrile or methacrylonitrile and subsequently esterifying the hydrolysis products are effective plasticizers for vinyl chloride resins. The new class of sulfonamide derivatives have the following structural formula:

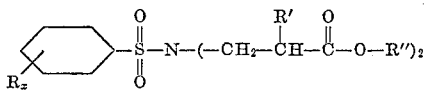

wherein R is a radical of the group consisting of hydrogen, methyl and ethyl, $x$ is a whole number from one to two, inclusive, R' is a radical of the group consisting of hydrogen and methyl, R'' is an aliphatic radical of the group consisting of hydrogen, oxahydrocarbon and thiahydrocarbon radicals having up to a total of fourteen carbon, oxygen and sulfur atoms. It has been found that the new class of compounds have unusually low volatility, however, if the R'' group exceeds a total of fourteen carbon, oxygen and sulfur atoms incompatibility with vinyl resins is frequently encountered.

The new compositions are prepared from the toluenesulfonamides, benzenesulfonamides, the ethylbenzenesulfonamides, and the xylenesulfonamides, or mixtures of the isomeric toluenesulfonamides, ethylbenzenesulfonamides or xylenesulfonamides frequently available as by-products, for example the mixture of ortho- and para-toluenesulfonamide obtained as a by-product in the manufacture of saccharin. The sulfonamides, or mixtures thereof, are condensed with acrylonitrile or methacrylonitrile and the resulting product hydrolyzed and esterified with an alcohol having a maximum of fourteen combined carbon, sulfur and/or oxygen atoms. Suitable aliphatic alcohols for esterifying the condensed nitriles are methyl, ethyl, propyl, isopropyl, tetradecyl, n-butyl, isobutyl, the various amyl, isononyl, hexyl and octyl alcohols, including 2-ethylhexyl alcohol, cyclohexyl alcohol, tetrahydrofurfurol, carbitol, butyl Cellosolve, 3-thia-n-pentanol, and other alkyl and cycloalkyl radicals which may have one or more $CH_2$ groups replaced by oxygen and/or sulfur atoms.

The following are compounds of the new class suitable for plasticizing vinyl resins.

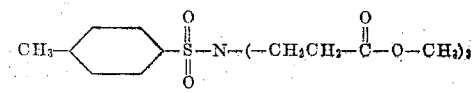

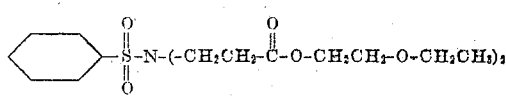

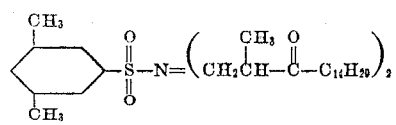

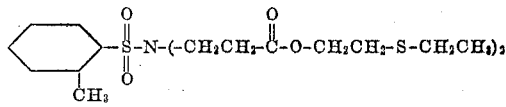

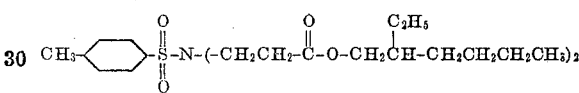

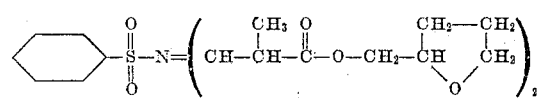

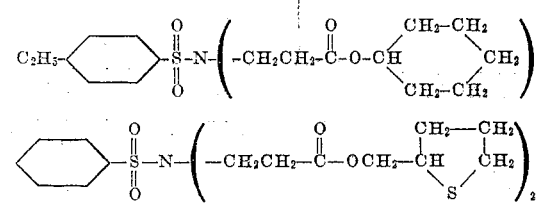

The new compounds are valuable plasticizers for polyvinyl chloride and copolymers of more than 70 percent of vinyl chloride and up to 30 percent of other polymerizable monomers compatible therewith, for example vinyl acetate and other vinyl esters of monocarboxylic acids, ethyl maleate, ethyl fumarate and other alkyl esters of maleic and fumaric acids.

The plasticizers are blended with the vinyl resin in the conventional manner, for example by mixing on a roll mill, a Banbury type mixer or any other suitable mixing device. The plasticizers are used in proportions necessary to achieve the desired plasticity. Although the quantity of plasticizer will depend upon the particular polymer to be plasticized, it is generally found that from 5 to 60 percent of plasticizer will in most cases produce a satisfactory composition for general utility. Such quantity of plasticizer will generally remain as a permanent part of the vinyl resin and the modified vinyl resin so prepared will not deteriorate or become embrittled by reason of the loss of the plasticizer during use.

The value of the plasticizers are estimated by three tests: (1) compatibility; (2) volatility; and (3) Clash-Berg flex temperature. The compatibility is determined by visual inspection, clarity being a requisite in many applications for vinyl chloride polymers. The volatility is estimated by the test of heating at 105° C. for 24 hours and measuring the percentage of the plasticizers evaporated by loss of weight. The Clash-Berg flex temperature is determined by cooling the polymer sample to about —50° C. and observing the change in the modulus of rigidity as the sample warms up to room temperature, the flex temperature being that at which the modulus of rigidity is 135,000 pounds per square inch. Of these tests the compatibility is of primary importance while the others are only critical for certain applications. If the polymer is to be subjected to outside weather conditions flex temperatures of —20 to —30° C. are desirable, otherwise 0° C. is satisfactory. If the polymer is to be subjected to elevated temperatures a volatility of 5 to 10 percent is advantageous, otherwise volatilities as high as 25 percent are often not objectionable. The volatilities and flex temperature of polymer plasticizer blends are difficult to predict and often have no apparent relationship to the physical constants of the plasticizer.

The new plasticizers are of general utility in softening vinyl chloride polymers and have desirable non-migratory properties. They may be used as the only plasticizing component in a compounded vinyl chloride polymer or they may be used in conjunction with other plasticizers.

Further details of the practice of this invention are set forth with respect to the following specific example.

*Example*

A round-bottom flask fitted with a mechanically driven stirrer, a dropping funnel, a thermometer and a reflux condenser, was charged with 171.2 grams of a mixture of ortho- and paratoluene sulfonamides and 50 grams of dioxane. The mixture was then heated to 100° C. and 1.5 grams of powdered sodium hydroxide was added as a catalyst. While maintaining the temperature at 90 to 95° C. a slight excess of two mole equivalents of acrylonitrile was added over a period of one hour. The mixture was stirred for three more hours at 100° C. and cooled. The catalyst, the excess acrylonitrile and the solvent were eliminated by washing with water. The residue was then heated on an oil bath for fifteen minutes at 140° C., under pressure of one to two mm. for the purpose of eliminating the more volatile components. The resulting product was identified as a mixture of N,N-di($\beta$-cyanoethyl) toluenesulfonamides. The nitrile was hydrolyzed by heating in aqueous hydrochloric acid and thereby converted to the corresponding acids.

The acid prepared in accordance with the preceding paragraph, N,N - di - ($\beta$-carboxyethyl) toluenesulfonamdie, was esterified by heating 25.2 parts with 74 parts of n-butanol in the presence of a trace of toluenesulfonic acid as a catalyst and 60 parts by weight of benzene. The mixture was heated at reflux temperature using a Dean and Stark trap to separate the water evolved. After the theoretical quantity of water was separated the reaction mass was washed with water and dilute sodium carbonate until neutral and the excess butanol and the benzene were evaporated by heating at reduced pressures. The residue, a light colorless liquid, was identified as a mixture of the ortho- and para-isomers of N,N - di - ($\beta$-carbobutoxyethyl) toluenesulfonamide.

The mixture of substituted toluenesulfonamides prepared in accordance with the preceding paragraph were compounded with polyvinyl chloride to the extent of 40 percent by weight based on the polyvinyl chloride. Intimate dispersion was obtained by means of a roll mill. Test specimens were molded and the Clash-Berg flex temperature and volatility measured in the manner described above. The plasticized sample was found to have a flex temperature of —14.5° C. and a volatility of 0.76 percent.

The invention is defined by the following claims.

I claim:

1. A compound having the structural formula:

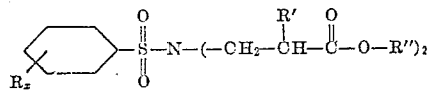

wherein R is a radical of the group consisting of hydrogen, methyl and ethyl, $x$ is a small whole number from one to two, inclusive, R' is a radical of the group consisting of hydrogen and methyl, and R'' is an aliphatic radical of the group consisting of hydrocarbon, oxahydrocarbon and thiahydrocarbon radicals having up to a total of fourteen carbon, oxygen and sulfur atoms.

2. N,N-di-($\beta$-carbobutoxyethyl) p-toluenesulfonamide having the structural formula:

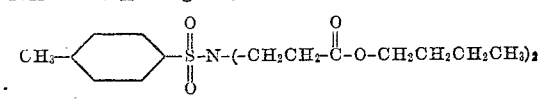

3. A mixture of isomeric N,N-di-($\beta$-carbobutoxyethyl) toluenesulfonamides.

4. A composition of matter comprising a polymer of at least 70 percent by weight of vinyl chloride and up to 30 percent of other polymerizable monomers compatible therewith, and from 5 to 60 percent by weight of the vinyl polymer of a compound having the structural formula:

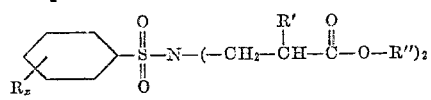

wherein R is a radical of the group consisting of hydrogen, methyl and ethyl, $x$ is a small whole number from one to two, inclusive, R' is a radical of the group consisting of hydrogen and methyl, and R'' is an aliphatic radical of the group consisting of hydrocarbon, oxahydrocarbon and thiahydrocarbon radicals having up to a total of fourteen carbon, oxygen and sulfur atoms.

5. A composition of matter comprising a polymer of at least 70 percent by weight of vinyl chloride and up to 30 percent of other polymerizable monomers compatible therewith, and from 5 to 60 percent by weight of the vinyl polymer of N,N-di-(β-carbobutoxyethyl) p-toluenesulfonamide having the structural formula:

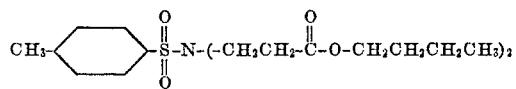

6. A composition of matter comprising a polymer of at least 70 percent by weight of vinyl chloride and up to 30 percent of other polymerizable monomers compatible therewith, and from 5 to 60 percent by weight of the vinyl polymer of a mixture of isomeric N,N-di-(β-carbobutoxyethyl) toluenesulfonamides.

JOACHIM DAZZI.

REFERENCES CITED

The following references are of record in the file of this patent:

UNITED STATES PATENTS

| Number | Name | Date |
|---|---|---|
| 2,071,917 | Bren | Feb. 23, 1937 |
| 2,424,664 | McQueen | July 29, 1947 |

OTHER REFERENCES

Oseki: Chem. Abstracts, vol. 14, page 2780, line 6 (1920).